United States Patent [19]

Howarth

[11] 4,424,174

[45] Jan. 3, 1984

[54] FABRICATION OF OPTICAL CONNECTORS

[75] Inventor: Louis E. Howarth, New Providence, N.J.

[73] Assignee: Bell Telephone Laboratories, Incorporated, Murray Hill, N.J.

[21] Appl. No.: 389,876

[22] Filed: Jun. 18, 1982

[51] Int. Cl.³ ............................................... G02B 5/14
[52] U.S. Cl. .................................... 264/1.5; 350/96.21
[58] Field of Search ....................... 264/1.5; 350/96.21, 350/96.20

[56] References Cited

U.S. PATENT DOCUMENTS

| | | | |
|---|---|---|---|
| 4,015,894 | 4/1977 | Rocton | 350/96.21 |
| 4,023,886 | 5/1977 | Nakayama et al. | 350/96.21 |
| 4,090,778 | 5/1978 | Phillips et al. | 350/96.20 |
| 4,107,242 | 8/1978 | Runge | 264/1.5 |
| 4,135,781 | 1/1979 | Archer | 350/96.20 |
| 4,158,477 | 6/1979 | Phillips et al. | 350/96.21 |
| 4,173,389 | 11/1979 | Curtis | 350/96.20 |
| 4,185,883 | 1/1980 | Chown et al. | 350/96.20 |
| 4,281,891 | 8/1981 | Shinohara et al. | 350/96.2 |
| 4,292,260 | 9/1981 | Cheung | 264/1.5 |

FOREIGN PATENT DOCUMENTS 2032642 5/1980 United Kingdom ............. 350/96.21

*Primary Examiner*—James B. Lowe
*Attorney, Agent, or Firm*—Lester H. Birnbaum

[57] ABSTRACT

Disclosed is a method of forming a molded, field-installable optical connector. The method uses a support assembly which includes a wire mandrel, (10), a mandrel holder, (11), surrounding a portion of the wire, and a mandrel sleeve, (12), surrounding a portion of the mandrel holder and including an end surface, (15). Positioned at the end surface is a watch bearing jewel, (16), with an aperture, (17), through which the wire is inserted. As backbone insert, (19), is also located around a portion of the mandrel sleeve. The assembly is positioned within a molding apparatus including a precision frusto-conical die, (25), by inserting the wire through a second jewel, (26), mounted in the die. After molding, the connector, which includes the first jewel embedded at one end of the molded part and the backbone insert as a strength member, is removed from the support assembly.

8 Claims, 4 Drawing Figures

FABRICATION OF OPTICAL CONNECTORS

BACKGROUND OF THE INVENTION

This invention relates to molded optical fiber connectors, and in particular to a method of making such connectors which are field-installable.

Optical communication systems require widespread use of connectors for coupling optical fibers to other fibers and to other portions of the system. The alignment of fibers for connection is critical, since the core diameters are very small (i.e., typically 50 to 100 micrometers) and slight misalignments can result in significant light loss. A typical approach to fiber connection at the present time involves molding a frustoconical piece-part around the end of the fiber so that the fiber is precisely aligned with respect to the axis of the cone. (In the context of this application a frusto-conical part refers to a full cone or one with a portion of the top removed.) The resulting fiber assembly can then be mated with another fiber assembly by means of a biconic sleeve (see, e.g., U.S. Pat. No. 4,107,242 issued to Runge).

While such connectors are useful for most transmission systems, the emergence of optical data systems has presented the need for a new type of connector which can be installed in the field. This allows the optical fibers to be cut to the particular lengths desired before connection is made. Although added onto the fiber during installation, the connector must still permit precise alignment with other fibers and apparatus. Further, once the fiber is inserted into the connector, some means must be provided to allow precision lapping of the protruding portion of the fiber.

Some proposals have been made for fieldinstallable connectors. For example, some connectors provide a watch bearing jewel mounted in a precision cylindrical metal ferrule (see, e.g., U.S. Pat. No. 4,185,883 issued to Chown; U.S. Pat. No. 4,135,781 issued to Archer; and U.S. Pat. No. 4,090,778 issued to Phillips). A precision hole in the jewel permits alignment of the fiber with respect to the outer wall of the connector. Also, the jewel can provide a good stop of lapping of the inserted fiber. However, precision machined metal ferrules can be very costly. Further, thermal expansion of the ferrule can result in distortions and misalignments in the connectors.

It is believed that a molded, field-installable connector can provide the necessary high precision alignment at a low cost. Although proposals have been made for molding connectors with watch bearing jewels around optical fibers (see, e.g., U.S. Pat. No. 4,292,260 issued to Cheung), there does not appear to be any teaching for providing a field-installable molded connector with a jewel for alignment of the inserted fiber.

It is therefore a primary object of the invention to provide a method of molding a field-installable connector which permits precise alignment of optical fibers. It is a further object of the invention to fabricate such a connector which provides a precision lapping surface for termination of any installed fiber.

SUMMARY OF THE INVENTION

These and other objects are achieved in accordance with the invention which is a method of fabricating an optical fiber connector. A support assembly is provided including an alignment wire mandrel, a mandrel holder formed around a portion of the wire and having an outer surface concentric therewith, and a mandrel sleeve formed aroung a portion of the wire mandrel and holder and having an outer surface concentric with the wire mandrel and holder. A jewel with an aperture therein coinciding with the central axis of the assembly is mounted at one end of the mandrel sleeve by inserting the wire through the aperture so that a portion of the wire extends therethrough. A backbone insert is also located around a portion of the mandrel sleeve. The resulting assembly is then inserted into a mold including a frusto-conical precision die section which includes at one wall a second jewel with an aperture coinciding with the axis of the cone. The wire is inserted through the aperture in the second jewel and force is applied to the mandrel sleeve to keep at least a portion of the first jewel in intimate contact with the die wall during the molding operation. A molded piece-part is then formed around the backbone insert and the first jewel. The support assembly is removed from the molded part to form a frusto-conical connector including the first jewel at the precision end surface.

BRIEF DESCRIPTION OF THE DRAWING

These and other features of the invention will be delineated in detail in the following description. In the drawing:

FIG. 4 is a partially cutaway view of a support assembly in accordance with a further embodiment of the invention.

It will be appreciated that for purposes of illustration, these figures are not necessarily drawn to scale.

DETAILED DESCRIPTION

Figure 1:
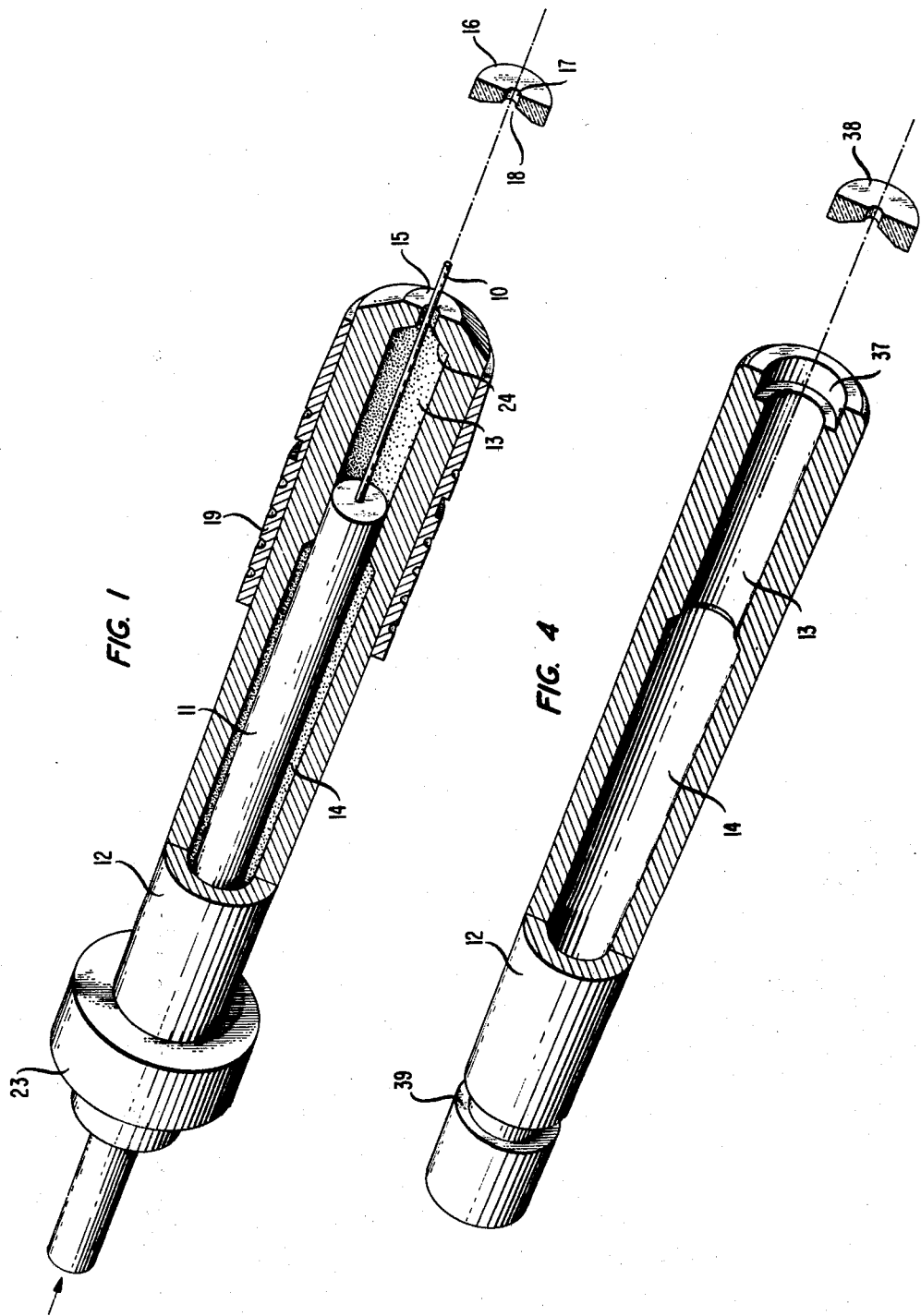
FIG. 1 is partially cutaway view of a support assembly and other components useful in the practice of the method according to one embodiment of the invention.

FIG. 1 illustrates the support assembly used in accordance with one embodiment of the invention. The assembly includes an alignment wire mandrel, 10, which is mounted in a fixed manner within a hole drilled at the central axis of the wire mandrel holder, 11. In this example, the wire mandrel was made of high speed steel and had a diameter of 0.00500 inches. The mandrel holder was made of a phosphorus-bronze alloy with an inner diameter of 0.006 inches and an outer diameter of 0.04 inches. The mandrel holder is adapted to fit snugly within a mandrel sleeve, 12, so that the alignment wire coincides with the central axis of the mandrel sleeve. In this example, the mandrel sleeve was made of steel with an outer diameter of 0.1055 inches, an inner diameter at the necked portion, 13, of 0.0410 inches and an inner diameter of the remaining portion, 14, of 0.055 inches. The inner and outer surfaces of the mandrel sleeve are made to be concentric with each other, preferably to within 0.001 inches. The mandrel sleeve also includes a narrowed end surface, 15. The dimensions of the end surface are chosen so that watch bearing jewel, 16, will fit snugly thereon. In this example, the diameter of the surface, 15, was 0.0600–0.0602 inches.

The watch bearing jewel, 16, was a commercially available ruby with a cylindrical shape and flat end surfaces. An aperture, 17, at least a portion of which was cylindrical, was provided in the jewel so that the axis of the aperture coincided with the axis of the jewel. In this example, the cylindrical portion of the aperture had a diameter of 0.0050–0.00570 inches and was concentric to the outer surface of the jewel to within 0.00196 inches. The outer diameter of the jewel was 0.0600–0.0602 inches. It will be noted that the portion of the aperture toward the end face directed toward the mandrel sleeve has a flared portion, 18, which is designed to allow fitting the jewel onto the end of the wire mandrel and to facilitate field assembly of the connector onto the fiber. In this example, the sides of the flared portion had an angle of approximately 115° with the axis so that the flared portion had a diameter of 0.018 inches at the surface.

The support assembly further includes a backbone insert, 19, mounted over a portion of the mandrel sleeve. The insert was typically made of aluminum. In this example, the inner diameter of the insert was approximately 0.106 inches and the outer diameter was 0.15 inches. The length of the insert was approximately 0.45 inches. Although in this example the insert was metal, it could be a molded part or any other material which is rigid and capable of withstanding the subsequent molding operation.

In a typical sequence. the wire mandrel, 10, and holder, 11, were inserted within the mandrel sleeve, 12, so that the holder was ⅛ inches to ¼ inches removed from end, 24, and the wire, 10, extended beyond the end surface, 15, preferably, by an amount of at least 0.13 inches. The jewel, 16, was then inserted onto the end surface by threading the wire through the aperture, 17, in the jewel. Next, the metal backbone insert, 19, was slidably mounted over a portion of the mandrel sleeve so as to extend from near the edge of the front end surface to the portion of the mandrel sleeve which will mark the back end boundary of the molding process. The insert is designed to fit smoothly over the mandrel sleeve but yet be easily removable from the sleeve after the molding process. The insert was typically placed 0.050–0.060 inches from end surface, 15.

Figure 2:
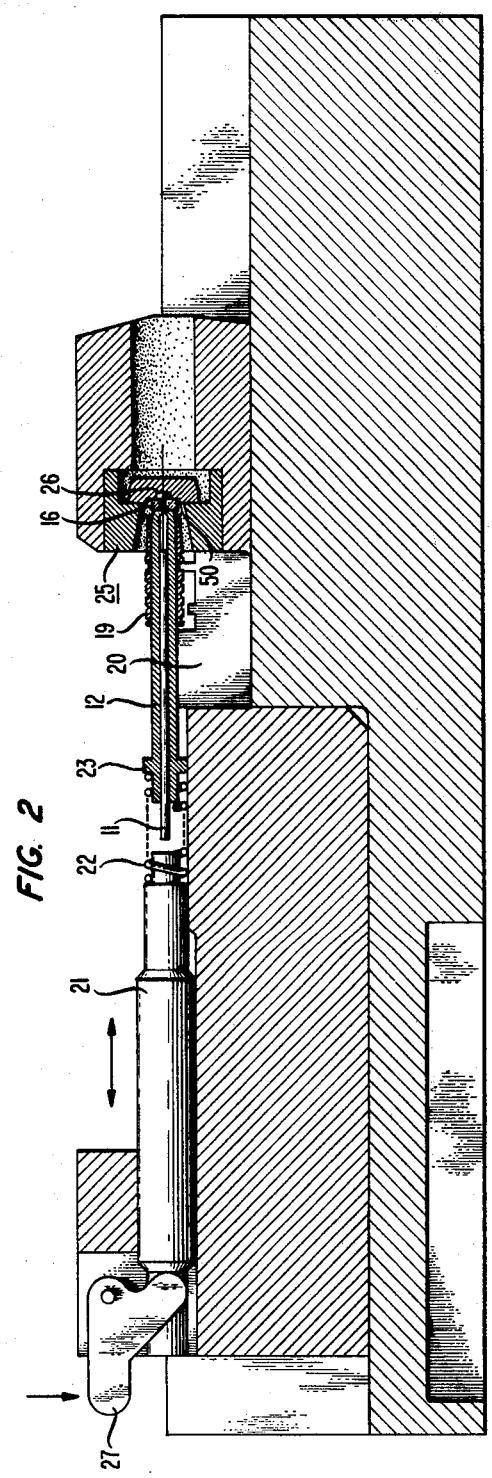
FIG. 2 is a cross-sectional view of the resulting assembly inserted in a molding apparatus in accordance with the same embodiment.

The support assembly with the metal insert thereon was then placed in the molding apparatus as shown in cross-section in FIG. 2. (The cover for the apparatus is omitted for the sake of clarity in the illustration.) The assembled wire mandrel, 10, holder, 11, mandrel sleeve, 12, jewel, 16, and metal backbone insert, 19, were fitted within a die half, 20. A spring, 22, was fitted over one end of a cylindrical member, 21, and was coupled to a retaining portion, 23, of the mandrel sleeve, 12, so that a force could be applied axially to the sleeve.

A portion of the molding apparatus included a precision die member, 25, with a mold cavity defining a frusto-conical shape. The die member was slidably mounted in the apparatus so it could be positioned around a portion of the metal insert over the support assembly as shown. The die included a second jewel, 26, embedded in the end wall, 50, at the narrow end of the conical shape, with an aperture coinciding with the axis of the conical shape. The second jewel was essentially the same as the first jewel, but with a smaller outer diameter (approximately 0.0400 inches in this example). The smaller diameter of the second jewel is preferred since it insures that at least a portion of the first jewel will rest against the die wall during molding. This insures that the first jewel will remain stationary even if there is some slight axial movement of the second jewel in the hole in which it is mounted. The size and shape of the aperture in the second jewel were identical to the first jewel. The sides of the cone made an angle of approximately 19.5° with the axis and the die cavity was approximately 0.25 inches long.

The support assembly was positioned within the die member, concentric with the axis of the cone, by threading the wire, 10, through the aperture in the second jewel and bringing the two jewels into contact. Intimate contact of the first jewel with the die wall (and second jewel) during molding is assured by the axial force applied by the lever, 27, to the cylindrical member, 21, after the mold is closed. This intimate contact insures that the face of the first jewel, 16, including the aperture therethrough, will remain exposed after the molded part is formed.

An appropriate molding compound, in this case an epoxy molding compound manufactured by Plasticon and sold under the designation 2929 B, was then introduced into the mold while the apparatus was heated to a temperature of approximately 350° F. The molding process was typically continued for a time of 3 minutes. In general, a temperature of 250°–350° F. for 2–5 minutes is preferred. Most standard molding compounds with good dimensional stability and short thermosetting times should be suitable for use in the present invention (see, e.g., U.S. Pat. No. 4,107,242 issued to Runge).

At the end of the molding operation, the support assembly was removed from the apparatus. The resulting connector, which included the molded piece-part (28 of FIG. 3), the metal insert, 19, and jewel, 16, was then removed by sliding it off the mandrel sleeve, 12, of the support assembly.

Figure 3:
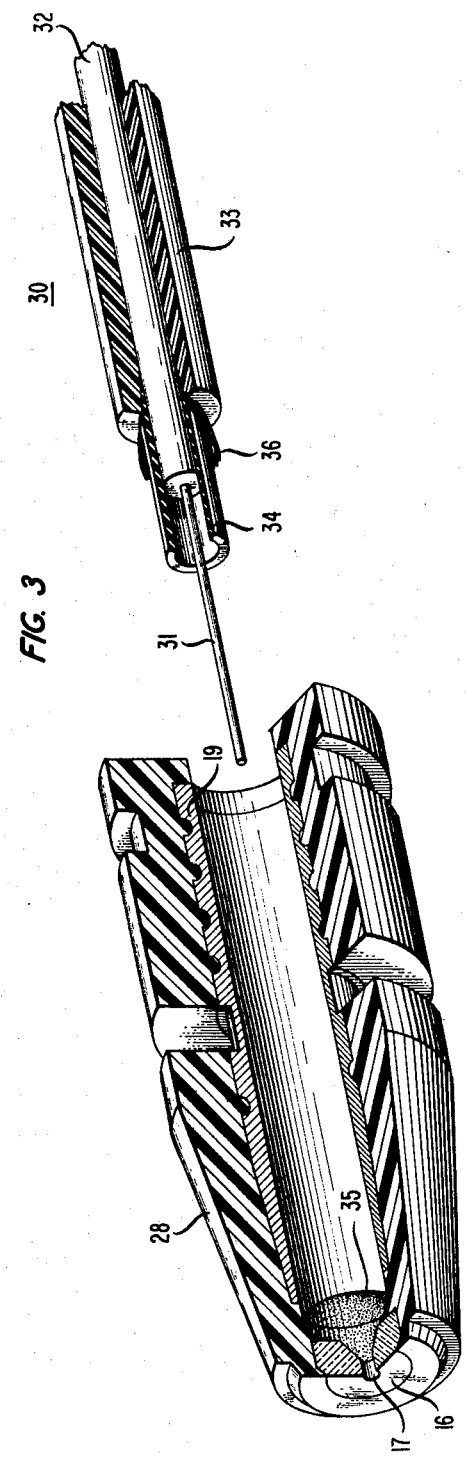
FIG. 3 is a partially cutaway view of an optical connector fabricated in accordance with the same embodiment, also illustrating the manner in which the connector may be utilized for connecting optical fibers.

FIG. 3 illustrates the final connector, partly cut away, along with a portion of an optical fiber, cable, 30, to demonstrate how the connector can be installed in the field. The standard fiber assembly includes the fiber, 31, (core and cladding) through which light is transmitted, an inner jacket, 32, surrounding the fiber, and an outer jacket, 33, surrounding the inner jacket. Also included between the inner and the outer jackets are strands, 36, of a reinforcing fiber such as Kevlar ®. The connector is this example is designed for glass fibers having a diameter (core and cladding) of 125 microns and an outside diameter (including the outer jacket) of 0.075 inches. The inner and outer jackets in this example were made of polyvinyl chloride.

To prepare the fiber assembly for connection, the outer (33) and then the inner (32) jackets are cut back as shown by a sufficient amount to expose enough of the glass fiber, 31, to permit the fiber to extend through the aperture, 17, in alignment jewel, 16. A metal cylinder, 32, is provided over the exposed portion of the inner jacket to space the jackets from the inner surface of the jewel. A few drops of optical cement, 35, such as Epo-tek ® 353 ND made by Epoxy Technology Incorporated can be inserted into the connector at the inner surface of the jewel. An epoxy preform can also be used conveniently. The prepared cable assembly is then inserted into the connector so that the fiber extends through the aperture in the jewel, and the spacer makes contact with the inside surface of the connector. The cement can then be cured to fix the position of the fiber assembly. The aperture in the jewel insures that the fiber will be colinear with the axis of the connector. The portion of the fiber which extends outside the aperture can then be removed by grinding or lapping. Another advantage of providing the jewel at the end of the connector is that it provides a precision lapping surface, which will insure that all of the projecting fiber is removed without also inadvertently shortening the connector. A cap (not shown) is typically provided around the connector to permit screwing onto a bionic sleeve for mating with other elements.

It will be appreciated that the dimensions given in the above example are primarily illustrative and the invention should not be limited thereby.

FIG. 4 illustrates a modified form of mandrel sleeve, 12, which may also be used in accordance with the invention. Elements corresponding to those of FIG. 1 are similarly numbered. As shown, this sleeve differs from the previously described sleeve primarily in that there is included at one end a seat, 37, in which is mounted a third jewel, 38. This jewel is similar to the jewel, 16, except that its outer diameter is smaller, in this example, approximately 0.040 inches. The jewel, 38, becomes a permanent part of the mandrel sleeve, so that during the molding operation, another jewel which is to become part of the connector (16 of FIG. 1) is threaded over the wire of the mandrel holder and is in intimate contact with both jewels, 38 and 26. This sleeve also includes a groove, 39, over which is fitted a retaining ring (not shown) to which spring, 22, is coupled during molding.

Various modifications of the invention will become apparent to those skilled in the art. All such variations which basically rely on the teachings through which the invention has advanced the art are properly considered within the spirit and scope of the invention.

What is claimed is:

1. A method of fabricating an optical fiber connector comprising the steps of:
    providing a support assembly comprising an alignment wire mandrel, a mandrel holder formed around at least a portion of the wire and having an outer surface concentric therewith, a mandrel sleeve located around at least a portion of said wire and holder and having an outer surface concentric therewith, said sleeve including an end surface for receiving a first precision jewel with an aperture therein, at least a portion of which aperture is concentric with the outer surface of the jewel;
    inserting said wire through the aperture in said jewel so that a portion of the wire extends therethrough;
    forming a backbone insert around a portion of the mandrel sleeve;
    inserting the resulting assembly in molding apparatus including a frusto-conical die which includes at one end wall a second jewel with an aperture which essentially coincides with the axis of the die, the wire being inserted through the aperture in the second jewel;
    forming a molded piece-part around the backbone insert and a portion of the first jewel; and
    removing the support assembly from the molded part and insert to form a frusto-conical connector including the first jewel at the end surface.

2. The method according to claim 1 wherein force is applied to the support assembly during molding of the piece-part to keep at least a portion of the surface of the first jewel in intimate contact with the end wall.

3. The method according to claim 1 wherein the first jewel forms a precision lapping surface at the end of the connector for removing excess portions of fiber subsequently inserted through the aperture in the jewel.

4. The method according to claim 2 wherein one end of the mandrel sleeve is coupled by means of a spring to a cylindrical member, and force is applied to the member during molding.

5. The method according to claim 1 wherein the material used to form the molded piece-part comprises an epoxy molding compound.

6. The method according to claim 5 wherein molding is done at a temperature of 250°–350° F. for a time of 2–5 minutes.

7. The method according to claim 1 wherein the apertures in the jewels are flared at the surfaces facing toward the support assembly.

8. The method according to claim 1 wherein the mandrel sleeve includes a seat into which is placed a third jewel thereby forming the end surface for receiving the first jewel.

* * * * *